April 11, 1961   S. J. GUT   2,978,914
BALL BEARING SEALED ROTATION TRANSMISSION DEVICE
Filed May 1, 1958   2 Sheets-Sheet 1
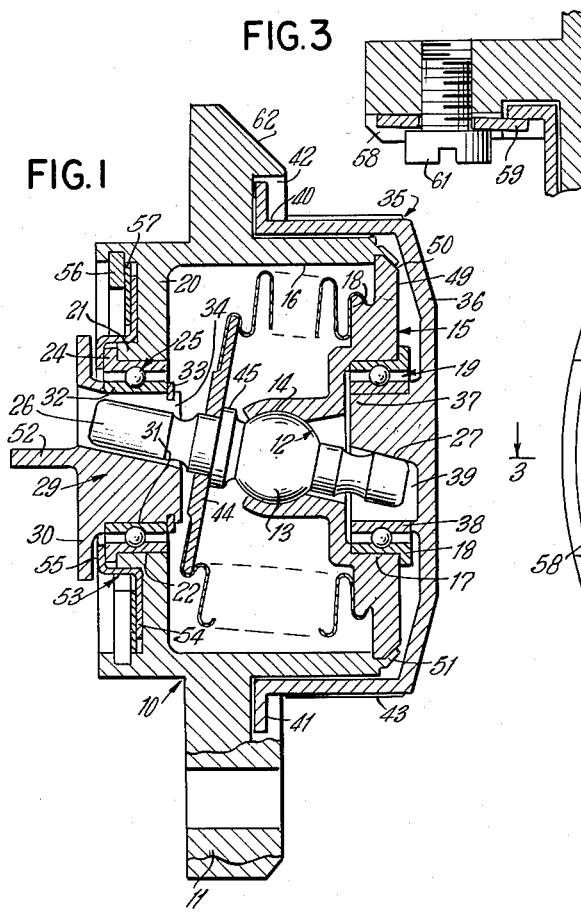
INVENTOR.
Stanley J. Gut
BY
ATTORNEYS April 11, 1961  S. J. GUT  2,978,914

BALL BEARING SEALED ROTATION TRANSMISSION DEVICE

Filed May 1, 1958  2 Sheets-Sheet 2

INVENTOR.
Stanley J. Gut

BY

ATTORNEYS

United States Patent Office 2,978,914
Patented Apr. 11, 1961

2,978,914

BALL BEARING SEALED ROTATION TRANSMISSION DEVICE

Stanley J. Gut, Packanack Lake, N.J., assignor to General Precision, Inc., a corporation of Delaware Filed May 1, 1958, Ser. No. 732,377

4 Claims. (Cl. 74—18.1)

This invention relates to a device for transmitting rotation between two rotatable elements, where one of the rotatable elements is separated from the other in two atmospheric environments, as where the control element is arranged to operate under normal atmospheric conditions, while the driven element is operated under pressure, or in a vacuum, or any other combination of operating conditions.

This invention represents an improvement on Patent No. 2,454,340 issued to W. A. Reichel, on November 23, 1948, on a "Sealed Transmitting Mechanism" which is known as a "Hermaflex," and assigned to the same assignee as the present invention.

In this invention, there is interposed between the driving and driven ends, a sealed flexible tubular unit or bellows, which separates the space between two pressure tight compartments, either of which may contain the driving element, with the driven element in the other compartment, or where one of the compartments is designed to be operated under atmospheric conditions, and is therefore not pressure tight.

Because of the increased sensitivity and accuracy required of a unit of this type in modern instruments used on aircraft, guided missiles and the like, the extreme variations between the temperature and pressure of the atmosphere of the area in which an instrument is mounted and the interior of the instrument, coupled with the extreme velocities and accelerations encountered in modern high-speed flight, the improved device represented by the present invention has been devised in order to operate under conditions beyond the range of the previous construction.

By introducing anti-friction bearings to support the driving and driven ends of the extension shaft attached to the apparatus, greater accuracy of movement can be obtained, coupled with the fact that the unit can be operated under a greater differential of pressure and temperature than was heretofore possible.

In instruments in which space is highly limited, it was found necessary to reduce the overall length of the unit between the driving and driven ends thereof to a minimum.

By supporting both the driving and driven ends of the shaft in precision ball bearings, the play in the unit can be reduced to a minimum, thereby reducing to a minimum the transmission errors, particularly in instances in which the direction of rotation of the shaft is reversed.

In one modification of the construction in which the pivoted center of the shaft is supported by a ball bearing fitted with a spherical segmental outer race, greater accuracy and closer fits can be obtained than was possible with a unit of the previous type, coupled with the fact that the shaft can be used for transmitting much greater loads at a higher degree of accuracy without introducing excessive wear at the pivot point of the central operating shaft.

The various modifications of the construction incorporated in this invention provide means for accomodating a wide range of installation and operating conditions in a wide range of instruments, operating under a wide range of temperatures, pressure conditions, and accuracy requirements than was heretofore possible.

Some of the features of the present construction represent the cumulative experience gained from a wide range of installations, operation under extreme ranges of temperature, pressures, and atmospheric conditions, as well as extreme adjustment accuracy requirements.

Units built in accordance with the various modifications included in the present invention are therefore most effectively utilized in installations in which operating conditions are beyond the range of those encountered in the prior construction represented by the above patent.

While anti-friction bearings have been introduced into units of this type in the past, the method of mounting the anti-friction bearings and supporting the various elements of the unit have presented manufacturing problems and accuracy requirements which tended to render these devices extremely costly, relatively bulky, and unsuitable for highly accurate installations, and in some instances relatively inaccurate, so as to render them unsuitable for many installations in which various modifications of the construction represented by the present invention have been utilized effectively.

The accompanying drawings, illustrative of one embodiment of the invention, and several modifications thereof, together with the description of their construction and the method of operation, mounting, adjustment and utilization thereof, will serve to clarify further objects and advantages of the invention.

In the drawings:

Figure 1 represents a longitudinal section through one embodiment of the sealed rotation transmission device, taken on the line 1—1 of Figure 2.

Figure 2 is a side elevation of the housing and the control cap of the Hermaflex unit shown in Figure 1.

Figure 3 is a section through a portion of the housing flange shown in Figures 1 and 2, showing the method of supporting the flange of the control cap, taken on the line 3—3, Figure 2.

Figure 5 is a longitudinal section through the assembled modified Hermaflex, shown in Figure 4, in a plane perpendicular to the plane in which Figure 4 is taken, the section being taken on the line 5—5, Figure 4.

Figure 7 is a longitudinal section, similar to Figure 5, through the assembled modified Hermaflex unit shown in Figure 6, taken on the line 7—7, Figure 6.

Figure 4:
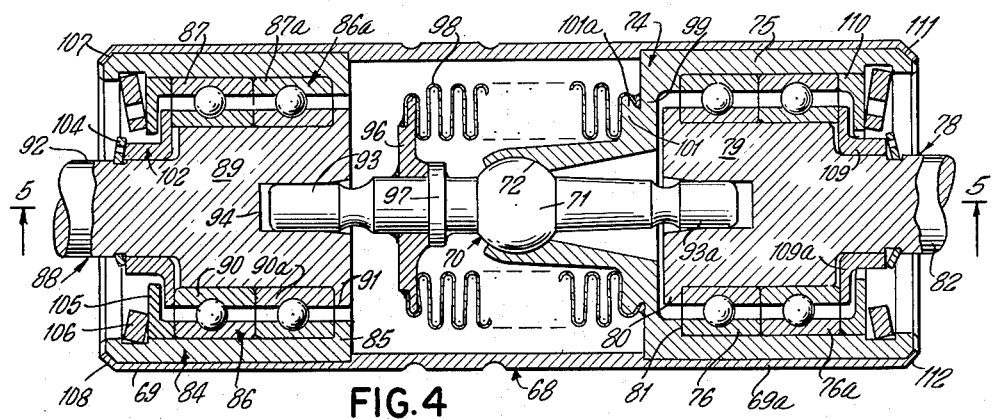
Figure 4 is a longitudinal section, similar to Figure 1, through a modification of the assembled sealed rotation transmission device, shown in Figure 1.

It will be understood that the following description of the construction and the method of operation, installation and utilization of the ball bearing equipped sealed rotation transmission device, is intended as explanatory of the invention and not restrictive thereof.

In the drawings, the same reference numerals designate the same parts throughout the various views, except where otherwise indicated.

One embodiment of the construction, shown in Figures 1 and 2, is mounted in a hollow substantially cylindrical housing 10, having a circular flange 11 integral with the outer circumference thereof.

A central shaft 12 having a spherical segmental pivot member 13 in the center thereof, is mounted at substantially the center of the housing, the pivot member being supported by the spherical segmental seat 14, of a flanged substantially circular seal member 15, which is fitted to the open outer end of the cylindrical section 16 of the housing, and supported thereby in a manner hereinafter described in greater detail.

The spherical segmental pivot member may either be integral with the shaft, or machined as a separate spherical segmental ball with a cylindrical central opening therethrough, and pressed on or otherwise fixedly attached to the cylindrical shaft.

The flange seal member 15 has a substantially circular counterbore 17 through the center thereof, in which the flanged outer race 18, of a ball bearing, or other type of anti-friction bearing is mounted.

The end of the housing 10, opposite the end to which the flange of the seal member 15 is fitted, has a circular wall 20 integral therewith, a substantially circular hub 21, integral with the center of the wall, having a substantially circular opening 22 therethrough, the opening being co-axial with, and of substantially the same diameter as the counterbore 17 in the seal member 15.

The flanged outer race 24, of a ball bearing 25, which is co-axial with the ball bearing 19 fitted to the seal member 15, is fitted to the central opening 22 in the hub 21.

The central shaft 12 has two cylindrical end sections 26, 27 integral therewith at the opposite ends thereof.

A substantially cylindrical shaft support 29 having a circular flange 30 integral with the outer end thereof, is fitted to the central hub 21 of the housing 10, the cylindrical section 31 of the shaft support being fitted through and supporting the inner race 32 of the ball bearing 25.

A snap ring 33, or other suitable type of lateral locating means, is fitted to a substantially circular groove around the outer circumference of the cylindrical shaft support to longitudinally locate the inner race 32 of the ball bearing relative to the shaft support. The inner race 32 of the ball bearing is clamped between a shoulder located at one end of the shaft support 29, adjacent the flange thereof, and the snap ring 33 which is fitted to the opposite end thereof.

The shaft support 29 has an angularly positioned parallel-faced cavity 34 therethrough, which is aligned with the sloping longitudinal axis of the central shaft 12, the cavity 34 receiving and supporting one cylindrical end section 26 of the central shaft.

A hollow substantially circular cup-shaped cap 35 is fitted to the cylindrical outer end of the housing 10, the substantially circular outer wall 36 of the cap having a cylindrical shaft support section 37 integral therewith, and extending inward therefrom. The cylindrical shaft support section 37 of the cap 35, is co-axial with the cylindrical section of the shaft support 29, the inner race 38 of the ball bearing 19 being pressed on or otherwise fitted to the cylindrical central section 37 of the cap.

The cylindrical shaft support section 37 of the cap has an angularly positioned parallel-faced cavity 39 through the outer circumference thereof, the width of the cavity 39 being slightly greater than the diameter of the adjacent cylindrical end section 37 of the central shaft, thus enabling the cavity to receive and support the cylindrical end section 27 of the central shaft.

The outer wall 40 of the cap, which is of substantially circular cross-section, is fitted to the outer circumference of the cylindrical section 16 of the housing, a circular flange 41 integral with the open of the cap being fitted to a circular counterbore 42 cut into the flange 11 of the housing, the flange 41 of the cap being attached to the housing in a manner hereinafter described in greater detail.

The outer circumference of the outer wall 40 of the cap 35 is knurled 43, or corrugated, in order to facilitate gripping the outer circumference of the cap, to enable the operator to manually rotate it.

A substantially circular disc 44 having a central opening therethrough, is fitted to a cylindrical pilot section of the central shaft 12, adjacent one cylindrical end section 26 thereof, a substantially circular shoulder 45 integral with the shaft engaging one face of the circular disc 44 to laterally locate it relative to the pivot center of the central shaft 12.

A corrugated bellows 46 of circular cross-section, made of thin corrosion resistant steel, or other suitable material, is fitted to the interior of the housing, between the circular disc 44 and the flange of the seal member 15. One end of the bellows 46 is spun around, or otherwise attached to the rounded outer circumference of the circular disc 44, the opposite end of the bellows, one face of which engages the annular face of a circular bellows support section 47, integral with the inner end of the seal member 15, being attached to the bellows support section 47. The end of the bellows spun around the circular disc 44 is soldered, brazed or otherwise heat sealed to the circular disc, thereby providing a positive seal. The bellows support section 47 of the seal member has a substantially circular rim 48 of arcuate cross-sectional contour, around the outer circumference thereof, the end of the bellows being spun around, or otherwise attached to the circular rim, and soldered, brazed or otherwise heat sealed to the outer circumference of the rim, thereby positively supporting the bellows and sealing the interior of the bellows between the disc 44, and the circular rim 48 of the seal member 15.

The outer circumference of the flange 49 of the seal member is chamfered 50, the outer wall of the circular shell of the housing 10 having a thin-walled projecting rim 51 integral therewith, the end of the projecting rim 51 being spun around the chamfered outer circumference of the flange, and soldered, brazed or otherwise heat sealed to the flange of the seal member, thus positively sealing the open end of the housing 10.

The cylindrical shaft support 29 has a substantially circular flange integral with the outer end thereof, a thin tongue 52, integral with the shaft support 29, projecting outward therefrom, substantially perpendicularly to the face thereof, the tongue being operative to fit into a mating slot in the rotatable member of a gyro, or other type of unit which is controlled by the "Hermaflex," which is the commercial trademark of the sealed transmission device, forming the subject of this invention.

A cupped bearing retainer 53 having a circular flange 54 integral therewith, is inserted between the outer flange of the outer race of the ball bearing 25 and the circular wall 20 of the housing, the inner surface of the rear wall 55 of the ball bearing retainer engaging the outer surface of the outer race of the ball bearing in order to retain the ball bearing within the hub 21 of the circular wall.

A snap ring 56 fitted to a groove of substantially rectangular cross-section in the outer wall of the housing 10, is pressed against a circular spacer disc 57 which is inserted between the snap ring and the outer surface of the flange 54 of the cupped bearing retainer, in order to retain the bearing retainer in its clamping position shown in Figure 1.

Figure 3 shows the method of attaching the flange 41 of the cap to the flange 11 of the housing.

A pair of diametrically opposite channels 58 of rectangular cross-sectional contour, is cut through the flange 11 of the housing, in the position shown in Figures 2 and 3. A substantially rectangular plate 59, the inner edge 60 of which is of concave arcuate contour to clear the outer circumference of the cap 35, is fitted to each of the channels 58. A fillister headed or other type of screw 61, threadably inserted in the flange 11 of the housing, is fitted through an opening through the center of the plate 59 to clamp the plate 59 to the flange of the housing, the inner portion of the plate 59 engaging the surface of the flange 41 of the cap, to clamp the flange 41 of the cap against the flange 11 of the housing.

The upper edge of the flange 11 of the housing is chamfered 62 at an angle of approximately 45°, along a substantially straight line, which is substantially parallel to the center line 63, connecting the axes of the screws 61.

A plurality of substantially circular holes 64 is cut through the flange 11 of the housing in a direction substantially perpendicular to the flange 11, to enable the flange 11 to be bolted or otherwise attached to an instrument to which the transmission device or "Hermaflex" is fitted.

Figure 5:
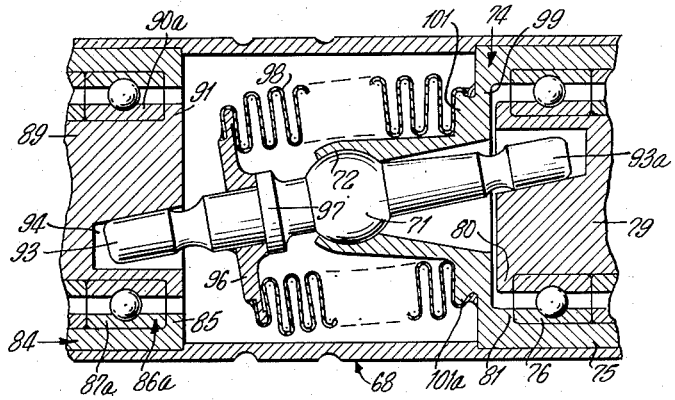

In a modification of the construction, shown in Figures 4 and 5, the entire unit is assembled in a tubular housing 68, the inner diameter of the ends 69, 69a of which are counterbored to accommodate the bearing support for the ends of the shaft of the unit.

The central shaft 70 is substantially the same as that shown in Figure 1, the central shaft having a spherical segmental pivot member 71 in substantially the center thereof, the pivot member being supported by a spherical segmental seat 72 formed in an extension 73 integral with a bearing support housing 74, which is fitted to the interior of one of the counterbored cylindrical ends 69a of the tubular housing 68, as shown at the right-hand side, Figure 4.

The bearing support housing has a long circular counterbore therein, forming a tubular section 75, in which a pair of ball bearings or other type of anti-friction bearings 76, 76a, mounted in tandem, is fitted.

A stub shaft 78, similar to that shown at the left-hand side of the unit, is fitted to the inner races of the ball bearings 76, 76a, the cylindrical body section 79 of the stub shaft 78, on which the inner races of the ball bearings 76, 76a are pressed, being concentric with the ball bearings 76, 76a, the body section of the stub shaft, having a substantially circular shoulder 80 integral with the inner end thereof, the inner face of the shoulder 80 being axially aligned with the annular shoulder 81, located at the left-hand end of the tubular section of the bearing support housing 74, thereby aligning the inner race of the bearing 76a with the outer race thereof.

A cylindrical shaft extension 82, which is utilized as the driving or driven shaft of the "Hermaflex" unit, depending upon the nature of the installation, projects beyond the right-hand end of the tubular housing, as shown in Figure 4, the shaft extension being attached to a housed member of an instrument or other unit to be driven. The right-hand ball bearings are held in place laterally in the bearing support housing 74 in a manner hereinafter described.

The internally counterbored end of the tubular housing, shown at the left-hand end of the unit, has a tubular sleeve 84 fitted thereto, the tubular sleeve having an inwardly projecting annular shoulder 85 integral therewith.

A pair of ball bearings, or other type of anti-friction bearings 86, 86a, is fitted to the tubular sleeve 84, the outer races 87, 87a of the ball bearings being longitudinally positioned by the internal annular shoulder 85 of the sleeve.

A stepped cylindrical stub shaft 88 is fitted to the interior of the tubular sleeve 84, the cylindrical body section 89 of the stub shaft 88, on which the inner races 90, 90a of the ball bearings are pressed, being concentric with the ball bearings 86, 86a, the enlarged cylindrical body section 89 of the stub shaft having a circular shoulder 91 integral therewith, the circular shoulder 91 being axially aligned with the inner annular shoulder 85 of the tubular sleeve 84, thereby aligning the inner races 90, 90a of the ball bearings 86, 86a with the outer races thereof, as shown in Figure 4.

A cylindrical extension shaft 92, which may be utilized to drive the "Hermaflex" unit, projects beyond the left-hand end of the housing, as shown in Figure 4, the extension shaft being attached to an external drive member, or knob, to drive the "Hermaflex" unit. The left-hand ball bearings 86, 86a are held in place in a manner hereinbefore described.

The central shaft 70 has a pair of co-axial cylindrical end sections 93, 93a integral with both ends thereof, in the same manner as that shown in Figure 1.

The body 89 of the stub shaft has an angularly positioned seat or cavity 94, of parallel-faced cross-section, with semi-cylindrical ends, integral therewith, the cavity 94 being substantially aligned with the sloping longitudinal axis of the central shaft 70, the cavity receiving and supporting one cylindrical end section 92 of the central shaft, as shown in Figures 4 and 5.

A substantially circular disc 96 having a central opening therethrough, is fitted to a cylindrical pilot section of the central shaft 70, between the spherical segmental central section 71 and one cylindrical end section 93 thereof, a substantially circular shoulder 97 integral with the central shaft 70 and located adjacent the spherical segmental pivot center thereof, engaging one face of the circular disc to laterally locate the circular disc relative to the pivot center of the shaft 70, in substantially the same manner as that shown in Figure 1.

A corrugated bellows 98, of circular cross-section, made of thin corrosion resistance steel, or other suitable thin sheet material, is fitted to the interior of the tubular housing 98, between the circular disc and the circular end wall 99 at the tubular end of the bearing support housing 74. One end of the bellows is spun around, or otherwise attached to the rounded outer circumference of the circular disc 96, the opposite end of the bellows, one face of which engages the annular face of a bellows support section 101 integral with the inner end of the end wall of the tubular section of the bearing support housing, being fixedly attached to the bellows support section 101. The bellows support section 101 has a substantially circular rim 101a of arcuate cross-sectional contour around the outer circumference thereof, the adjacent end of the bellows being spun around, or otherwise fixedly attached to the arcuate cross-section of the circular rim, in substantially the same manner as that shown in Figure 1, and soldered, brazed or otherwise fixedly attached thereto. The end of the bellows spun around the outer circumference of the circular disc 96 is also soldered or brazed thereto, thereby sealing the interior of the bellows between the circular disc 96 and the bellows support section 101 at the opposite end of the bellows, in substantially the same manner as that shown in Figure 1.

A flanged tubular inner bearing retainer 102 of circular cross-section is fitted to the cylindrical extension shaft 93 at the left-hand end of the unit, the circular flange 102a of the inner bearing retainer engaging the inner race of the left-hand ball bearing 86, thereby longitudinally locating the ball bearing along the body of the stub shaft 88.

A snap ring 104, fitted to a groove around the outer circumference of the extension shaft, engages the tubular section of the inner bearing retainer 102, thereby gripping the inner bearing retainer.

A similar tubular outer bearing retainer 105 is fitted to the inner circumference of the left-hand tubular sleeve 84, a dished snap ring 106, or other type of spring member fitted to a circumferential groove around the inner circumference of the tubular sleeve 84, engaging the circular inner face of the outer bearing retainer 105, thereby locking the outer race of the ball bearing 86.

The left-hand end of the sleeve 84 inserted in the counterbored left-hand end of the tubular housing is chamfered 107, as shown in Figure 5, the thin-walled outer circumference of the tubular housing being spun 108 around the chamfer, and welding, brazed, or soldered to the adjacent end of the sleeve 84 in the manner shown in Figure 5.

A flanged tubular inner bearing retainer 109, similar to that shown at the left-hand side, Figure 5, is fitted to the right-hand extension shaft 82, the circular flange 109a of the inner bearing retainer engaging the inner race of the right-hand ball bearing 76, thereby locking the inner race of the right-hand ball bearing 76a, in a manner similar to that in which the left-hand bearing 86 is locked. A snap ring 104, which is fitted to the circumferential groove around the shaft extension 82, engages the tubular section of the inner retainer in the same manner as that of the left-hand inner retainer 102.

A tubular outer bearing retainer 110 is fitted to the inner circumference of the tubular section of the bearing support housing 74, a dished snap-ring 106, substantially the same as that on the right-hand side, being fitted to a groove in the inner circumference of the bearing support housing 74, to grip the bearing retainer and lock the outer race of the ball bearing in the same manner as that on the left-hand side.

The right-hand end of the tubular section of the bearing support housing is chamfered 111, as shown in Figure 5, the thin-walled outer circumference of the right-hand end of the tubular housing being spun 112 around the chamber, and welded, brazed or otherwise heat sealed to the tubular end of the bearing support housing in substantially the same manner as the left-hand end shown in Figure 4.

Figure 6:
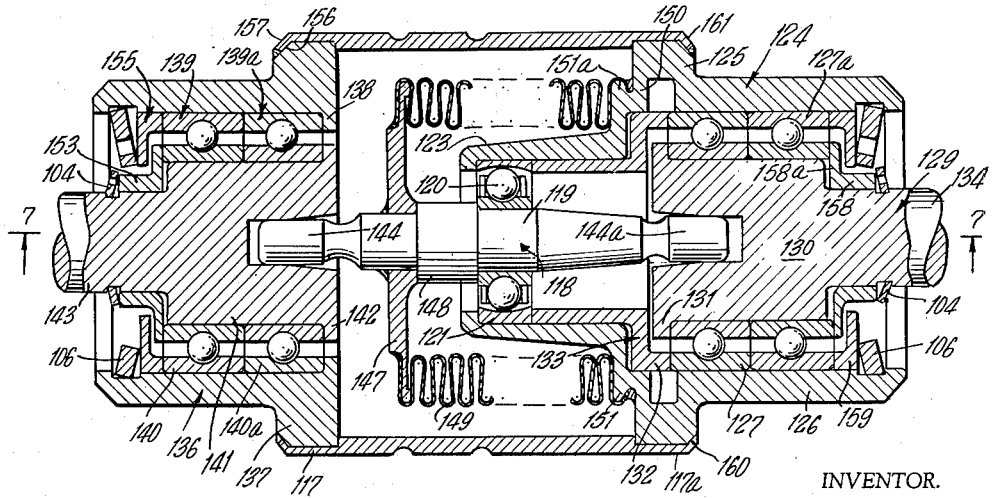
Figure 6 is a longitudinal section, similar to Figure 4, through another modification of the assembled sealed torque transmission device, shown in Figures 1 and 4.

In another modification of the "Hermaflex" construction, which is shown in Figures 6 and 7, a shorter tubular housing 116, which is similar to that shown in Figures 4 and 5, is utilized to support the assembled unit, the relatively short ends 117, 117a of the housing being counterbored to receive and support the bearing supports, in a manner similar to that shown in Figures 4 and 5.

The central shaft 118 is similar to that shown in Figures 4 and 5, except that a cylindrical central section 119, is provided in place of the spherical segmental pivot, a self-aligning ball bearing 120, fitted with an outer race 121, the inner surface of which is of spherical segmental cross-section, as shown in Figures 6 and 7, being fitted to the cylindrical central section 119.

The outer race 121 of the ball bearing is fitted to the substantially cylindrical interior of a tubular extension 123, which is integral with a bearing support housing 124, the outer flange 125 of which is fitted to one of the counterbored cylindrical ends 117, 117a of the tubular housing 116, as shown at the right-hand side, Figure 6.

The bearing support housing has a tubular section 126 integral with the central outer flange 125 thereof and projecting outward therefrom, right-hand, Figure 6. A pair of ball bearings 127, 127a is fitted to the tubular section of the bearing support housing in substantially the same manner as those shown in Figures 6 and 7.

A stub shaft 129, similar to that shown in Figures 4 and 5, is fitted to the inner races of the ball bearings 127, 127a, the cylindrical body section 130 of the stub shaft, on which the inner races of the ball bearings 127, 127a are pressed, being concentric with the inner diameter of the tubular section 126 of the bearing support housing, the body section having a substantially circular flange 131 integral with the inner end thereof, the inner face of the flange, which engages the inner race of the ball bearing 127, being axially aligned with the corresponding face of the circular rim 132, of a bearing spacer 133, which is interposed between the outer race of the central self-aligning ball-bearing 120, and the outer race of the ball bearing 127, as shown in Figure 6, thereby accurately aligning the inner race of the ball bearing 127a with the outer race thereof.

A cylindrical extension shaft 134 of smaller diameter, which is utilized as a driving or driven shaft of the "Hermaflex" unit, depending upon the method by which the unit is connected to an instrument, projects beyond the right-hand end of the tubular section 126 of the bearing support housing, in a manner similar to that shown in Figure 4. The ball bearings 127, 127a are located laterally in a manner similar to those shown in Figures 4 and 5.

The internally counterbored end 117 of the tubular housing, shown at the left-hand side, Figure 6, has a tubular sleeve 136 fitted thereto, the tubular sleeve having a flange 137 of larger diameter than the body thereof integral with the right-hand end thereof, the flange being pressed into or otherwise fitted to the interior of the counterbored left-hand end 117 of the tubular housing 116. The flanged inner end of the tubular sleeve 136 has an inwardly projecting annular shoulder 138 integral therewith.

A pair of ball bearings 139, 139a is fitted to the interior of the tubular sleeve 136, the outer races 140, 140a of the ball bearings being longitudinally located by the internal shoulder 138 of the tubular sleeve.

A stub shaft, similar to that shown in Figure 4, is fitted to the interior of the tubular sleeve 136, the cylindrical body section 141 of the stub shaft, on which the inner races of the ball bearings 139, 139a are pressed, being substantially concentric with the inner diameter of the tubular sleeve 136. The body section 141 of the stub shaft has a circular shoulder 142 integral with the inner end thereof, the surface of the circular shoulder 142, which engages the inner race of the ball bearing 139a, being axially aligned with the inner annular shoulder 138 of the tubular sleeve 136, thereby aligning the inner race of the ball bearing 139a with the outer race 140a thereof, in substantially the same manner as that shown in Figure 4.

A cylindrical extension shaft 143 of smaller diameter than the body 141 of the stub shaft, which is utilized in the same manner as the right-hand extension shaft 134, projects beyond the left-hand end of the tubular sleeve 136, in the same manner as that shown in Figure 4.

The central shaft 118 has a pair of cylindrical ends 144, 144a, which are co-axial with the cylindrical bearing support section 119, integral therewith, the cylindrical ends being angularly located relative to the longitudinal axis of the tubular sleeve in the position shown in Figure 7.

The body 141 of the stub shaft has an angularly positioned seat or cavity 145 therein, similar to that shown in Figure 4, to receive and support one cylindrical end 144 of the central shaft.

The cross-sectional contour of the cavity 145 and the angular position of the axis thereof is such as to permit the central shaft 118 to be rotated from one angular position 118 shown in Figure 7, through the neutral position in which the longitudinal axis of the central shaft coincides substantially with the longitudinal axis of the housing 116, to the opposite angular position, in which the angle formed by the longitudinal axis of the central shaft, relative to the longitudinal axis of the housing is substantially reversed from that shown in Figure 7, the left-hand cylindrical end of the central shaft being located above the longitudinal axis of the housing, when the central shaft 118 is rotated by means of the extension shaft 143, the extension shaft being driven by a gear attached to the extension shaft, or by other suitable drive means, depending upon the requirements of a particular application.

A substantially circular disc 147 is fitted to the central shaft 118 near the cylindrical bearing support section 119 thereof, a cylindrical shoulder 148, integral with the central shaft 118, longitudinally locating the circular disc 147, in substantially the same manner as that shown in Figures 4 and 5.

A corrugated bellows 149, similar to that shown in Figures 4 and 5, is fitted to the interior of the tubular housing, between the circular disc 147, and the circular inner wall 150 of the central flange section 125 of the bearing support housing. One end of the bellows 149 is spun around, or otherwise attached to the rounded outer circumference of the circular disc 147, in the same manner as that shown in Figure 4, and soldered, brazed or otherwise attached thereto, the opposite end, one corrugated face of which engages the annular face of a bellows support section 151 integral with the inner end of the circular wall 150, the adjacent end of the bellows being spun around or otherwise attached to a substantially circular rim 151a of arcuate cross-section located around the outer circumference of the bellows support section, in substantially the same manner as that shown in Figure 4, the end of the bellows being soldered, brazed or otherwise fixedly attached to the bellows support section. The end of the bellows spun around the outer circumference of the circular disc 147 is also soldered or brazed thereto, thereby sealing the interior of the bellows between the circular disc 147 and the bellows support section 151 at the opposite end of the bellows.

A flanged tubular inner bearing retainer 153, similar to that shown in Figure 4, is fitted to the cylindrical extension shaft 143 at the left-hand end of the unit, the circular flange 153a thereof engaging the inner race of the left-hand bearing 139, in the same manner as that shown in Figure 4.

A snap ring 104, fitted to a groove around the outer circumference of the extension shaft 143, engages the tubular section of the inner bearing retainer 153, thereby laterally locating the inner bearing retainer 153 in the same manner as that shown in Figure 4.

An outer bearing retainer 155, similar to that shown in Figure 4, is fitted to the inner circumference of the left-hand tubular sleeve 136, a dished snap ring 106, fitted to a circumferential groove in the tubular sleeve, engaging the circumferential outer face of the bearing retainer 155, thereby locking the outer race of the ball bearing in the same manner as that shown in Figure 4.

The left-hand end of the flange 137, at one end of the tubular sleeve 136, is chamfered 156 in the same manner as that shown in Figure 4, the thin-walled outer circumference of the end of the tubular housing being spun 157 around the chamfer and welded to the end of the sleeve flange 137 in the same manner as that shown in Figure 4.

A flanged tubular inner bearing retainer 158, substantially the same as that shown at the left-hand side, is fitted to the right-hand extension shaft 134, the circular flange 158a of the tubular bearing retainer, locking the inner race of the ball bearing 127a in the same manner as that located at the left-hand side. A snap ring 104, which is fitted to the circumferential groove around the right-hand extension shaft 134, locates the end of the inner bearing retainer 158 in the same manner as that located at the left-hand end.

A tubular outer bearing retainer 159, substantially the same as that located at the left-hand end, is fitted to the inner circumference of the tubular section of the bearing support housing 125, a dished or other type of snap ring 106, substantially the same as that shown at the left-hand side, being fitted to a groove in the inner circumference of the tubular section of the bearing support housing 124, in the same manner as that shown at the left-hand side, Figure 4.

The right-hand end of the flange 125 of the bearing support housing 124 is chamfered 160 in the same manner as that on the left-hand side, the thin-walled outer circumference of the right-hand end of the tubular housing 116 being spun 161 around the chamfer and welded or brazed to the chamfered end of the flange in the same manner as the left-hand end.

Computations and tests to determine the comparative mechanical efficiencies of the type of Hermaflex unit shown in the W. A. Reichel Patent No. 2,454,340, hereinbefore described, as compared to the ball bearing types shown in Figures 4, 5, 6 and 7, show a vast improvement in mechanical efficiency of the ball bearing type, shown in Figures 4 and 5, and an even further improvement in the ball bearing pivot type shown in Figures 6 and 7.

The calculated efficiency of the ball bearing construction, of the type shown in Figures 1, 2 and 4, 5, runs up as high as 80%.

With the full ball bearing type, including the ball bearing pivot shown in Figures 6 and 7, the calculated efficiency would be as high as 90%.

Both these efficiency figures represent a definite improvement over the previous type of "Hermaflex" unit, shown in the above patent and enable this type to be used in the applications in which the amount of force available for operating the "Hermaflex" unit is relatively small.

It will be apparent to those skilled in the art, that the present invention is not limited to the specific details described above and shown in the drawings, and that various modifications are possible in carrying out the features of the invention and the operation and the method of support, mounting, actuation and utilization thereof, without departing from the spirit and scope of the appended claims.

What is claimed is:

1. A sealed rotation transmission coupling for externally controlling a rotative part within a casing; comprising a housing having an integral substantially circular end wall adjacent one end thereof, the end of the housing opposite the end wall having an open tubular section integral therewith, a seal member of substantially circular contour fixedly attached to the open tubular end of the housing, said seal member having an integral extension projecting into the housing, with a spherical segmental seat in the interior of the extension, a nutatory shaft having a spherical segmental section intermediate its ends supported by the spherical segmental seat, a first anti-friction bearing fitted to the end wall of the housing, a second anti-friction bearing spacedly located relative to and axially aligned with the first anti-friction bearing, supported by the seal member, said anti-friction bearings being co-axial with the housing, a first substantially cylindrical member having an angularly located cavity therein for receiving and supporting one end of the nutatory shaft supported by the first anti-friction bearing, a second cylindrical member, co-axial with the first cylindrical member, supporting the opposite end of the central shaft, supported by the second anti-friction bearing, a flexible bellows surrounding the nutatory shaft, a circular member attached to the central shaft beyond the spherical segmental pivot section thereof, fixedly attached and sealed to one end of the bellows, the seal member having a substantially circular section thereof extending into the housing, the outer circumference of the circular section of the seal member being of arcuate cross-sectional contour, the adjacent end of the bellow being spun around the outer circumference of the circular section of the seal member and heat-sealed thereto to seal the end of the bellows, opposite the end attached to the circular member, the second cylindrical member having manually controllable means fixedly attached thereto, operative to rotate the nutatory shaft, the first cylindrical member having means fixedly attached thereto, operative to engage an externally mounted device for controlling the rotation thereof, coordinated with the rotation of the manually controllable means, the manually controllable means integral with the outer end of the second cylindrical member consisting of a cap of substantially circular cross-sectional contour, said cap having a tubular section surrounding the outer tubular end of the housing, to support and guide the cap, the circular member attached to the nutatory shaft being a substantially circular disc, the adjacent end of the bellows being spun around the outer circumference of the circular disc, and heat sealed to the circular disc.

2. A moisture-proof sealed torque transmission mechanism, for externally controlling a rotative part within a casing; comprising a substantially tubular housing, a first closure member having a tubular extension integral therewith, projecting into the housing, said tubular extension having a hollow spherical segmental shaft support seat formed in substantially the center thereof, a central shaft for universal rotation fitted to the tubular extension, the central shaft having a spherical segmental section intermediate the ends thereof fitted to the spherical segmental seat, a second closure member sealed to the end of the housing opposite the first closure member, each of said closure members having a pair of anti-friction bearings supported thereby, the pairs of anti-friction bearings being spacedly located and co-axially aligned relative to one another, a substantially cylindrical shaft support member rotatably supported by each pair of anti-friction bearings, both pairs of anti-friction bearings being co-axial with the housing, each of said shaft support members having a cavity therein to receive and guide the adjacent end of the central shaft, the cavities being angularly positioned relative to the longitudinal axis of the housing in one plane, a line connecting the nominal axes of the two cavities intersecting the pivot center of the central shaft, a flexible bellows surrounding the central shaft and the tubular extension of the first closure member, a substantially circular disc attached to the central shaft between the spherical segmental section and one end of the central shaft, means fixedly attaching and sealing one end of the bellows to the circular disc, the first closure member having a substantially circular section integral therewith, and projecting into the housing, said circular section of the first closure member having a substantially circular section integral therewith, and projecting into the housing, said circular section of the first closure member being a substantially circular projection thereof extending into the housing, the outer circumference of the circular projection being of arcuate cross-sectional contour, the end of the bellows opposite that attached to the circular disc, being spun around the outer circumference of the circular projection and heat-sealed thereto to support and seal the end of the bellows located opposite the circular disc, control means integral with each of the cylindrical shaft support members, extending longitudinally outward therefrom, beyond the housing, said control means being operative to selectively control the rotation of the central shaft and transmit the rotation of the central shaft to a housed externally mounted device, both ends of the housing being counterbored to form individual thin-walled tubular sections, the first and second closure members being fitted to the adjacent thin-walled tubular sections of the housing, the open end of each thin-walled tubular section of the housing being pressed against and heat sealed to the adjacent end of the corresponding closure member to seal the interior of the tubular housing.

3. A moisture proof sealed torque transmission mechanism, for externally controlling a rotative part within a casing; comprising a substantially tubular housing, a first closure member sealed to one end of the housing, said closure member having a tubular extension integral therewith, projecting into the housing, said tubular extension having a hollow spherical segmental shaft support seat formed in substantially the center thereof, a central shaft for universal rotation fitted to the tubular extension, the central shaft having a spherical segmental section intermediate the ends thereof fitted to the spherical segmental seat, a second closure member sealed to the end of the housing opposite the first closure member, each of said closure members having a pair of anti-friction bearings supported thereby, the pairs of anti-friction bearings being spacedly located and co-axially aligned relative to one another, a substantially cylindrical shaft support member rotatably supported by each pair of anti-friction bearings, both pairs of anti-friction bearings being co-axial with the housing, each of said shaft support members having a cavity therein to receive and guide the adjacent end of the central shaft, the cavities being angularly positioned relative to the longitudinal axis of the housing in one plane, a line connecting the nominal axes of the two cavities intersecting the pivot center of the central shaft, a flexible bellows surrounding the central shaft and the tubular extension of the first closure member, a substantially circular disc attached to the central shaft between the spherical segmental section and one end of the central shaft, means fixedly attaching and sealing one end of the bellows to the circular disc, the first closure member having a substantially circular section integral therewith, and projecting into the housing, said circular section of the first closure member being a substantially circular projection thereof extending into the housing, the outer circumference of the circular projection being of arcuate cross-sectional contour, the end of the bellows opposite that attached to the circular disc, being spun around the outer circumference of the circular projection and heat-sealed thereto to support and seal the end of the bellows located opposite the circular disc, control means integral with each of the cylindrical shaft support members, extending longitudinally outward therefrom, beyond the housing, said control means being operative to selectively control the rotation of the central shaft and transmit the rotation of the central shaft to a housed externally mounted device, each of the anti-friction bearings having an inner race, and an outer race concentric with the inner race and separated therefrom, each of the closure members having an internal shoulder integral therewith, at the end thereof facing the interior of the housing, the mating cylindrical shaft support member having an external circular shoulder integral therewith, and axially aligned with the internal shoulder of the mating closure member, said shoulders being operative to engage the adjacent face of one bearing of the pair of anti-friction bearings to align the inner and outer races of said bearing relative to one another, a substantially circular outer bearing retainer fitted to each closure member adjacent the outer end thereof, said outer bearing retainer being operative to engage the outer anti-friction bearing of the adjacent pair, the closure member having an internal groove therein adjacent the outer bearing retainer, spring means fitted to said groove operative to engage the outer bearing retainer to retain the pair of bearings in engagement with the internal shoulder of the closure member, the control means of each cylindrical shaft support member being a cylindrical section of a diameter smaller than the outer diameter of the cylindrical shaft support member and co-axial therewith, extending outward beyond the housing, said cylindrical section having a tubular inner bearing retainer slidably fitted thereto adjacent the outer surface of the cutter bearing of the adjacent pair of anti-friction bearings, said cylindrical section having a circumferential groove around the outer circumference thereof, adjacent the inner bearing retainer, and a spring snap ring fitted to the circumferential groove in the cylindrical section, operative to maintain the inner bearing retainer in engagement with the adjacent bearing to longitudinally locate the pair of anti-friction bearings.

4. A high speed sealed torque transmission apparatus; comprising a substantially tubular housing, a first closure member sealed to one end of the housing, said closure member having an extension integral therewith projecting into the housing, said extension having a central bearing support opening therein, a self-aligning ball bearing mounted in said bearing support opening, a central shaft for universal rotation supported by the self-aligning ball bearing, a second closure member sealed to the end of the housing opposite the first closure member, each of said closure members having a pair of anti-friction bearings supported thereby, the pairs of anti-friction bearings supported by said closure members being spacedly located and co-axially aligned relative to one another, a substantially cylindrical shaft support member rotatably supported by each pair of anti-friction bearings, both pairs of anti-friction bearings being co-axial with the housing, each of said shaft support members having a cavity therein to receive and rotatably support the adjacent end of the central shaft, the cavities being angularly positioned relative to the axis of the casing in one plane, a flexible bellows surrounding the central shaft, a substantially circular disc attached to the central shaft between the self-aligning bearing and one end of the central shaft, the first closure member having a substantially circular section integral therewith, said circular section being a substantially circular projection of the end wall of the first closure member extending into the housing, the outer circumference of the circular projection being of arcuate cross-sectional contour, the end of the bellows opposite that attached to the circular member being spun around the outer circumference of the circular projection and heat-sealed thereto to support and seal the end of the bellows opposite the end attached to the circular disc, the adjacent end of the bellows being spun around the control means integral with each of the cylindrical shaft support members and extending longitudinally outward therefrom beyond the housing, said control means being operative to selectively control the rotation of the central shaft, and transmit the rotation of the central shaft to an externally mounted device, both ends of the housing being counterbored to form individual thin-walled tubular sections, the first and second closure members being selectively fitted to the adjacent thin-walled tubular sections of the housing, each thin-walled tubular section of the housing being spun around and heat sealed to the adjacent closure member to seal the interior of the tubular housing, each of the anti-friction bearings having an inner race and an outer race concentric with the inner race and separated therefrom, each of the closure members having an internal shoulder integral therewith at the end thereof facing the interior of the housing, the mating cylindrical shaft support member having a circular shoulder integral therewith, and axially aligned with the internal shoulder of the mating closure member, said shoulders being operative to engage the adjacent face of one bearing of the pair of anti-friction bearings to align the inner and outer races of said bearing relative to one another, a substantially circular bearing retainer fitted to each closure member adjacent the outer end thereof, said bearing retainer being operative to engage the outer anti-friction bearing of the adjacent pair, the inwardly extending shoulder of the closure member, and the outer retainer being operative to axially align one pair of anti-friction bearings relative to the adjacent closure member, and spring means supported by the closure member operative to engage the outer retainer to force the outer retainer against the adjacent anti-friction bearing, the control means of each of the cylindrical shaft support members being a cylindrical section of a diameter smaller than the cylindrical shaft support member, co-axial therewith, and extending outward beyond the housing, said cylindrical section having a tubular bearing retainer slidably fitted thereto, adjacent the outer surface of the outer bearing of the adjacent pair of anti-friction bearings, and spring means removably attached to the cylindrical section operative to maintain the inner bearing retainer in engagement with the adjacent anti-friction bearing to locate the pair of anti-friction bearings.

References Cited in the file of this patent

UNITED STATES PATENTS

| | | |
|---|---|---|
| 1,731,009 | King | Oct. 8, 1929 |
| 2,454,340 | Reichel | Nov. 23, 1948 |
| 2,707,882 | Kent | May 10, 1955 |
| 2,770,139 | Shen | Nov. 13, 1956 |
| 2,860,933 | Wolff | Nov. 18, 1958 |

FOREIGN PATENTS

| | | |
|---|---|---|
| 844,831 | Germany | July 24, 1952 |